United States Patent
Hayward et al.

(10) Patent No.: US 7,031,004 B1
(45) Date of Patent: Apr. 18, 2006

(54) WEB PRINT SUBMISSION FROM WITHIN AN APPLICATION

(75) Inventors: Ken Hayward, Brockport, NY (US); Marc Krolczyk, Rochester, NY (US); Dawn M. Marchionda, Marion, NY (US); David M. Parsons, Victor, NY (US); Susan W. Lyon, Fairport, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/383,981

(22) Filed: Aug. 26, 1999

(51) Int. Cl.
*G06F 15/00* (2006.01)

(52) U.S. Cl. .................... 358/1.15; 358/1.13

(58) Field of Classification Search ............ 358/1.15, 358/1.1, 1.13, 1.16, 448, 400, 401, 1.12, 358/1.14, 202, 203, 225, 230, 1.17
See application file for complete search history.

(56) References Cited

U.S. PATENT DOCUMENTS

| | | | | |
|---|---|---|---|---|
| 5,524,085 A | * | 6/1996 | Bellucco et al. | 709/248 |
| 5,911,776 A | * | 6/1999 | Guck | 709/217 |
| 5,930,810 A | * | 7/1999 | Farros et al. | 715/506 |
| 5,960,167 A | * | 9/1999 | Roberts et al. | 358/1.15 |
| 6,012,070 A | * | 1/2000 | Cheng et al. | 715/505 |
| 6,012,083 A | * | 1/2000 | Savitzky et al. | 709/202 |
| 6,134,568 A | * | 10/2000 | Tonkin | 715/526 |
| 6,240,456 B1 | * | 5/2001 | Teng et al. | 709/230 |
| 6,320,671 B1 | * | 11/2001 | Kelley et al. | 358/1.18 |
| 6,327,045 B1 | * | 12/2001 | Teng et al. | 358/1.15 |
| 6,753,883 B1 | * | 6/2004 | Schena et al. | 715/741 |
| 2002/0078160 A1 | * | 6/2002 | Kemp et al. | 709/208 |
| 2003/0011806 A1 | * | 1/2003 | Shiohara | 358/1.15 |

FOREIGN PATENT DOCUMENTS

| | | |
|---|---|---|
| EP | 0 782 068 A1 | 7/1997 |
| WO | WO 99/28834 | 6/1999 |

* cited by examiner

*Primary Examiner*—Mark Wallerson
(74) *Attorney, Agent, or Firm*—Oliff & Berridge, PLC

(57) ABSTRACT

A method, computing machine and computer readable medium provides a computer user with the ability to route a print job to a service bureau over the Internet. The computer receives a print command input for printing a document. In response to the print command, the document is routed over the Internet to a service bureau for printing. Routing may involve activating a communications browser program in the computer and transmitting the document to a server associated with the service bureau. An Internet print web page including information identifying print job options and a print order form is retrieved from the server and displayed on the computer screen. In response to ther user's selection of a print job option identified on the print job order form, the print job and order form is transmitted to the service bureau.

29 Claims, 4 Drawing Sheets

WEB PRINT SUBMISSION FROM WITHIN AN APPLICATION

FIELD OF INVENTION

The invention generally relates to routing a print job over the world wide web to a remote location for printing and, more particularly, to providing a user with a user interface to send a print job from within a common application over the Internet to a remote printing location.

BACKGROUND OF THE INVENTION

Often individuals or companies desire to have documents professionally reproduced. The vast majority of individuals and companies do not have the facilities to generate large or professional quality reproductions of documents. Thus, large print jobs have been dropped off at a professional print shop or commercial service bureau, such as Kinko's, Ikon or the like. More particularly, in the past, if a user had generated a document such as a report in a word processing application and desired professional print copies in bulk, they would either download the document onto a disk or print the document locally at their home or office and have the document and/or disk delivered to the commercial service bureau for further handling.

Delivering the documents to the commercial service bureau required a trip to the service bureau's location, which in many cases required time, travel costs and inconvenience and added a layer of delay in obtaining the documents back from the service bureau. In a corporate environment, the person delivering the print job to the service bureau was typically not the person who requested the job. Thus, an intermediary, not very familiar with the job requirements, often had to deliver special instructions for the job. This creates a significant risk for error, further delaying the time of completion of the desired print job from the service bureau.

Kinko's has developed a software package to address many of these shortcomings. The software package, referred to as Kinkonet$^{SM}$, allows a user to send documents digitally from their work station to one or several Kinkonet$^{SM}$ print shops, where the document will be produced and delivered according to the user's specifications. The Kinkonet$^{SM}$ software is a standalone package useable with Microsoft Windows or Apple Macintosh. Thus, the Kinkonet$^{SM}$ software is a program group which the user installs on their machine and is then locatable in the user's program manager.

The first time Kinkonet$^{SM}$ is run the user provides personal information about her location, billing preferences, contact information, and a remote destination for the print job. When a user wants to route a print job to Kinko's, she must open the Kinkonet$^{SM}$ application and create an order which includes identifying the specifications of the order. Also, the user can modify their customer profile and the desired destination.

The order is created in what is referred to as an electronic job ticket. When the electronic ticket has been completed by the user, the user must attach the relevant file(s) to the ticket. To attach the files, the user must go back through their directory to find the file in its drive and directory and/or folder in which it is located. Also, the user must identify the source of the application, e.g., MS Word™, MS Excel™, etc. If the application is not supported by Kinkonet$^{SM}$, the user must save their file in a standard format called Post-Script, that is recognized by a variety of applications. However, each application performs this task differently and the user must know or figure out how to create such a postscript file.

When the user has completed the necessary forms and attached their file, they activate a send job button. In response, Kinkonet$^{SM}$ software initializes a modem coupled to the user's terminal and dials out to Kinkonet$^{SM}$ over the phone line. The status of the transmission appears at the bottom of the screen and a confirmation dialog box will appear once the document has been transferred via the telephone modem to Kinko's.

There are several disadvantages associated with the Kinkonet$^{SM}$ method of sending documents to a service bureau for printing. For example, a user must obtain a copy of the Kinkonet$^{SM}$ software package before even routing a print job to Kinko's. Also, every time Kinko's adds a new feature or capability, the user will not know of the new feature or capability and the Kinkonet$^{SM}$ software will not support the same. To have access to new features and capabilities, the Kinkonet$^{SM}$ software would have to be constantly updated to include new features and capabilities. Also, with Kinkonet$^{SM}$, the user may have to navigate through a number of dialog boxes prior to retrieving the desired file(s) for the print job. The inattentive or unsophisticated user may forget the location of the file. Further, if the file requiring a print job is in an application not supported by Kinkonet$^{SM}$, the user must refer to a manual for the specific set up requirements to attach the job to the print order. Thus, there is a need in the art to provide an improved user friendly, simplistic methodology for submitting a print job to a service bureau.

SUMMARY

The present invention overcomes the aforementioned problems associated with conventional methods of routing a print job to a service bureau by employing a novel system and method for electronically routing a print job to a service bureau. Specifically, a system and method according to the present invention allows a user to be within any application (e.g., MS Word™, MS Excel™, Adobe PhotoShop™ etc.) and send a print job to a service bureau with the same robustness and top level options as one would expect from a local or direct-networked printer.

According to the present invention, one of the print options defined for an application is the service bureau. When a user selects the service bureau printing option, the user's communications browser is activated to automatically access a URL (universal resource locator) address of the service bureau over the Internet. Thus, a print job page from the service bureau's web site is displayed on the screen. Any specific print requirements can be defined by filling in a form with appropriate print options and a series of dialog boxes as necessary. When the user has completed defining any particular information on the form, the user can select a button displayed on the web page for submission of the print job to the service bureau. Alternatively, the user may define print options locally at their computer terminal and transmit a completed form over the web, for example, automatically, upon selection of the service bureau printing option.

According to another embodiment of the present invention, when the user selects the service bureau printing option, the user's web browser is activated to automatically access a URL of an intermediary (e.g., Xerox) web site. A web page of the intermediary is displayed which provides a user with links to service bureaus allowing a user to select a particular service bureau to perform their print job. A user may select (e.g., pointing and clicking, dragging and dropping, speech recognition etc.) a service bureau from the intermediary's page based on a number of parameters including location of service bureau, type of print job, and many others. When the service bureau is selected, the print job is transmitted thereto over the Internet. In different embodiments of the present invention, the print job parameters may be defined by the user prior to accessing the intermediary's web site, at the intermediary's web site, or at the service bureau's web site.

According to the present invention, an exemplary method for submitting a document in electronic form to a service bureau for printing includes the steps of receiving a print command input to a computer for printing a document stored in memory accessible to the computer, and responsive to the print command, routing the document over the Internet to a service bureau for printing. The step of routing may include the steps of activating a communications browser program in the computer, and transmitting the document to a server associated with the service bureau. Further the inventive method may involve the steps of retrieving an Internet print web page from the server, the Internet print web page including information identifying plural print job options, displaying the Internet print web page on the computer, the Internet web page including a print job order form, and responsive to a user selection of one or more print job options identified on the print job order form, transmitting the print job order form to the service bureau.

The present invention may be embodied in a computing machine comprising a computer controlled by software modules, a first module to sense an Internet print request, and a second module to launch a communications browser module to access a server associated with a service bureau at a predefined address, the server providing the browser with a print order form. The computing machine may further include a third module to display the print order form, and a fourth module to transmit print order data and a document to be printed to the server providing the browser with the print order form. In one embodiment of the invention, the document to be printed includes multimedia content.

BRIEF DESCRIPTION OF THE DRAWINGS

The present invention will now be described in more detail with reference to preferred embodiments of the invention, given only by way of example, and illustrated in the accompanying drawings in which.

DETAILED DESCRIPTION OF CERTAIN PREFERRED EMBODIMENTS

The present invention is discussed below with reference to a method and system for submitting a print job over the world wide web to a service bureau for printing. It should be understood, however, that a print job can be routed through the world wide web to any defined location with printing capability.

Figure 1:
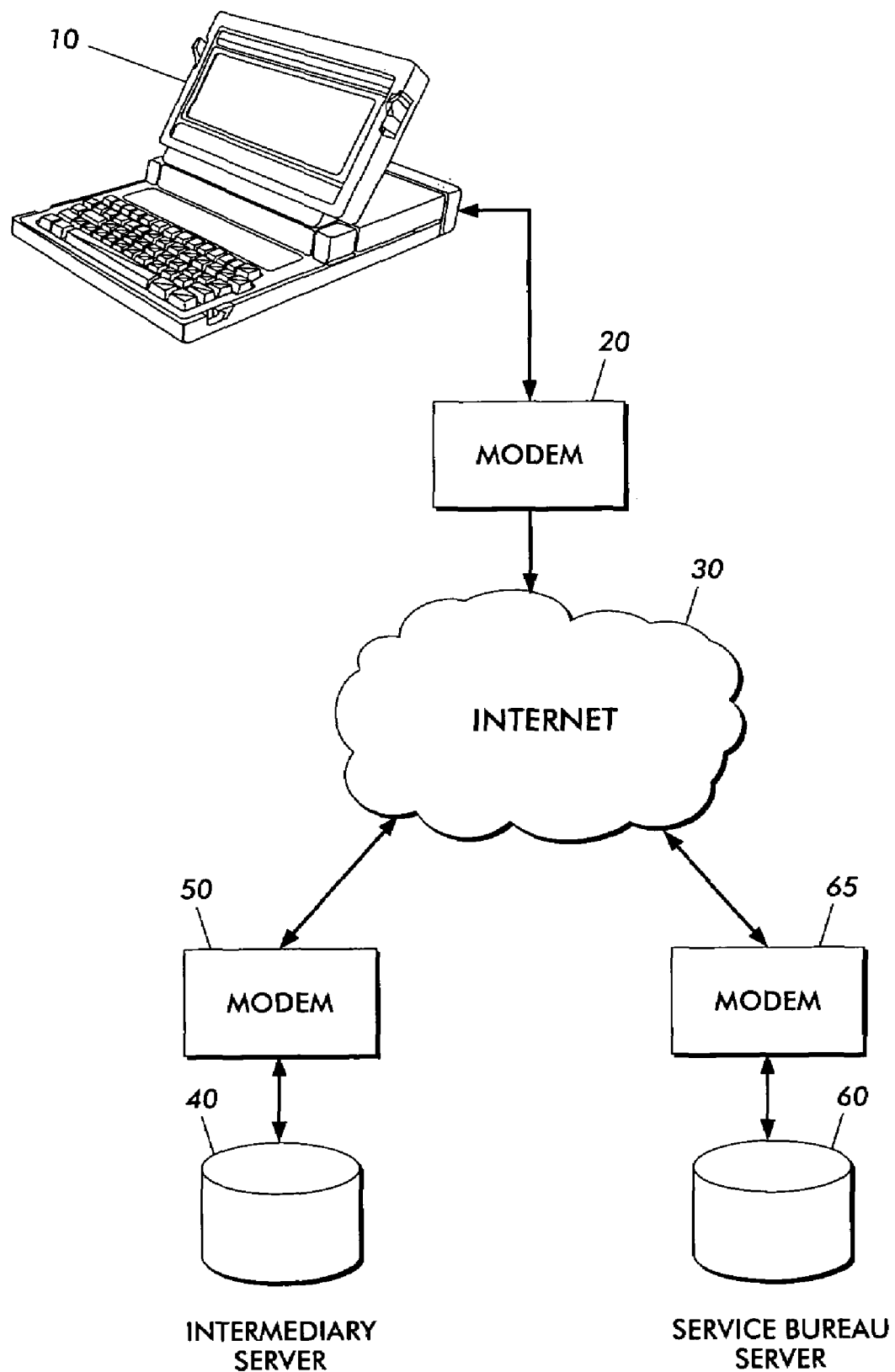
FIG. 1 is an illustrative block diagram showing a communications system for implementing the present invention.

FIG. 1 shows a diagram in which a computer 10 has a modem 20 to convert binary data to analog telephone data. In this way, the computer 10 may be connected to Internet 30. The computer 10 has installed and operating thereon an Internet (or web) browser (i.e., a software module that runs on the computer to interface the user to the Internet). Existing browsers include Microsoft Internet Explorer™ 3.01a, Netscape Navigator™ 3.01 and others.

The Internet 30, as depicted in FIG. 1, represents any packet switched communications system. Presently, Internet access services are often provided by Internet Service Providers (ISPs). Typically, an ISP maintains a point of presence (POP) in the user's local telephone system to give the user a local telephone number to call. In this case, modem 20 is a telephone modem, and under user control the browser causes modem 20 to place a call to the POP. The POP is linked to the ISP's main service center by trunk lines in one form or another. The ISP's main service center has a bank of modems (not shown) to reconvert the analog telephone signals into computer binary information, and a computer (also not shown) in one form or another to connect to the Internet backbone (a digital or binary communications system, also not specifically shown). The Internet backbone includes an Internet pier (i.e., terminal) where properly formatted digital signals from the ISP's main service center are launched onto the Internet backbone. The user, through his browser, may access any site on the Internet based on a URL (universal resource locator). Everything from the POP to the Internet backbone is covered by the representation of Internet 30 in FIG. 1.

Other communications protocols may be used and are equivalent. For example, ISDN (integrated services digital network) is a widely used high speed communication protocol. DSL (digital subscriber line) is a newer protocol that is still growing in acceptance. Cable telephony systems are establishing special "cable modems" as an alternative to a telephone modem. A cable modem communicates with a headend of a cable system where the communication is routed through a trunk to an Internet pier, either directly or indirectly through an ISP. These or other protocols may be used to link modem 20 to the Internet 30.

A computer 10 according to the present invention may be any type of computing device including, but not limited to, a personal computer, a lap top, palm top, wrist watch, or hand-held computer. The computer must have sufficient speed and memory capability to interface with the Internet. The user may interact with the computer 10 through any user interface including, but not limited to, a mouse, a stylus, a keyboard, light pen, voice recognition circuit or other user interface.

Separate and apart from the Internet, an intermediary (e.g., Xerox) owns or leases a server 40 connected to the Internet 30 through a modem 50 and a service bureau leases or owns a server 50 connected to the Internet 30 through a modem 60. Modem 50 and Modem 60 each may connect to the Internet either directly or indirectly through an ISP.

The computer 10 contains a printers file where printer drivers may be installed for various printer destinations. According to the present invention, a software module for at least one Internet printer is loaded onto the computer. The software module defines a printer driver for an Internet print shop printer. The Internet print shop printer is associated with a service bureau to which the user may route a print job. Other printer drivers defined may include local or direct-networked printers known in the art.

Figure 2:
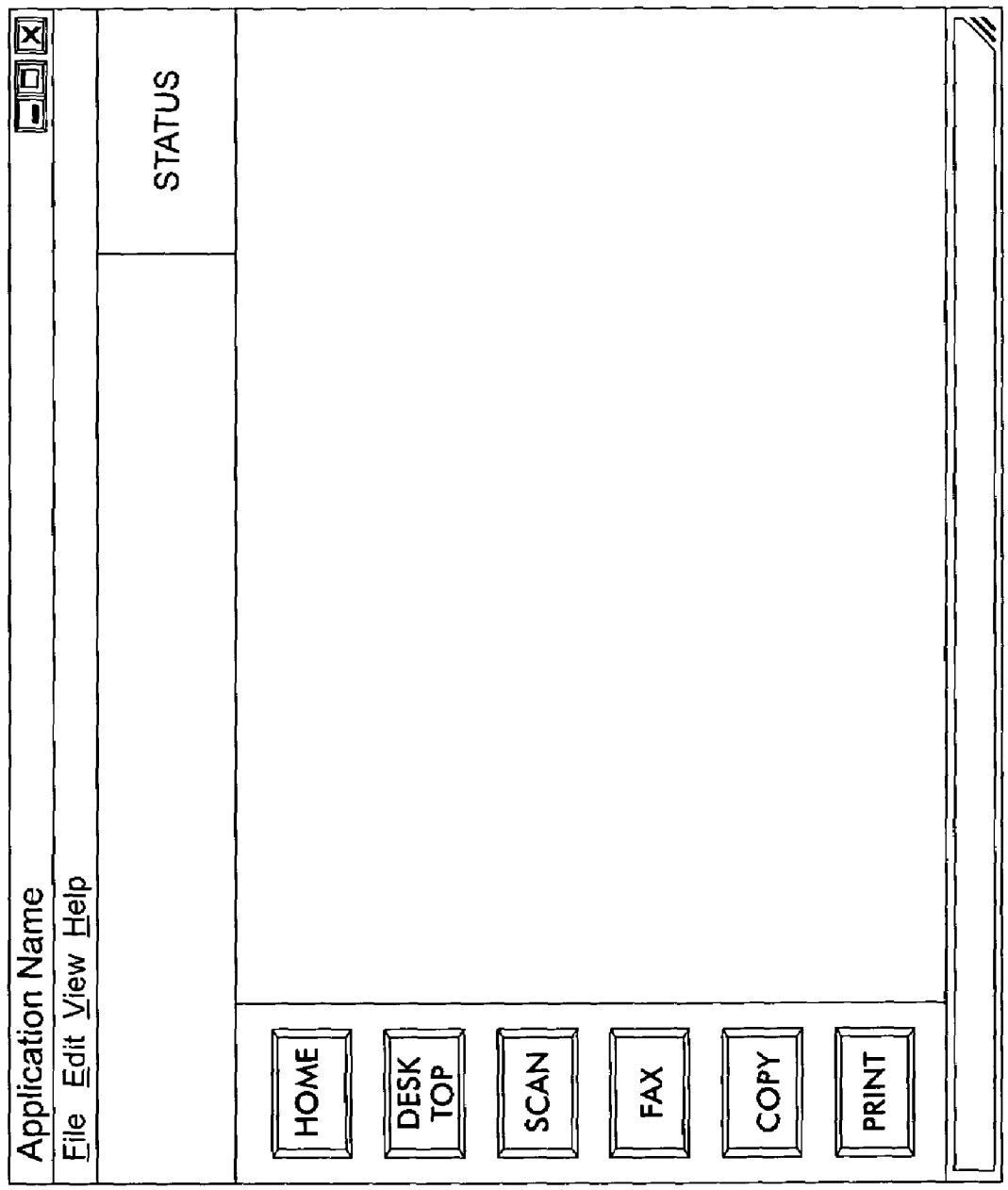
FIG. 2 is a view of an exemplary computer screen display of an active application environment in which the present invention may be implemented.

In an illustrative embodiment of the present invention depicted in FIG. 2, a user is in an applications program such as, but not limited to, a word processing program (e.g., MS Word™, a database program, a graphics program, a multimedia program, file manager, or the like. A user, desirous of having a service bureau print a document, selects the print option from within an application. In FIG. 2, the user actuates the "PRINT" button on the display.

According to one embodiment, responsive to actuation of the print button, a print dialog box appears on the user display. The print dialog box may include the typical print parameters such as number of copies, range of pages to be printed, format of print job, destination printer and others. The user may change the predefined settings as desired. One of the available destination printer's available is an external service bureau, such as Kinko's. In other embodiments, the user may select the print destination from a print menu bar or tool bar.

Figure 3:
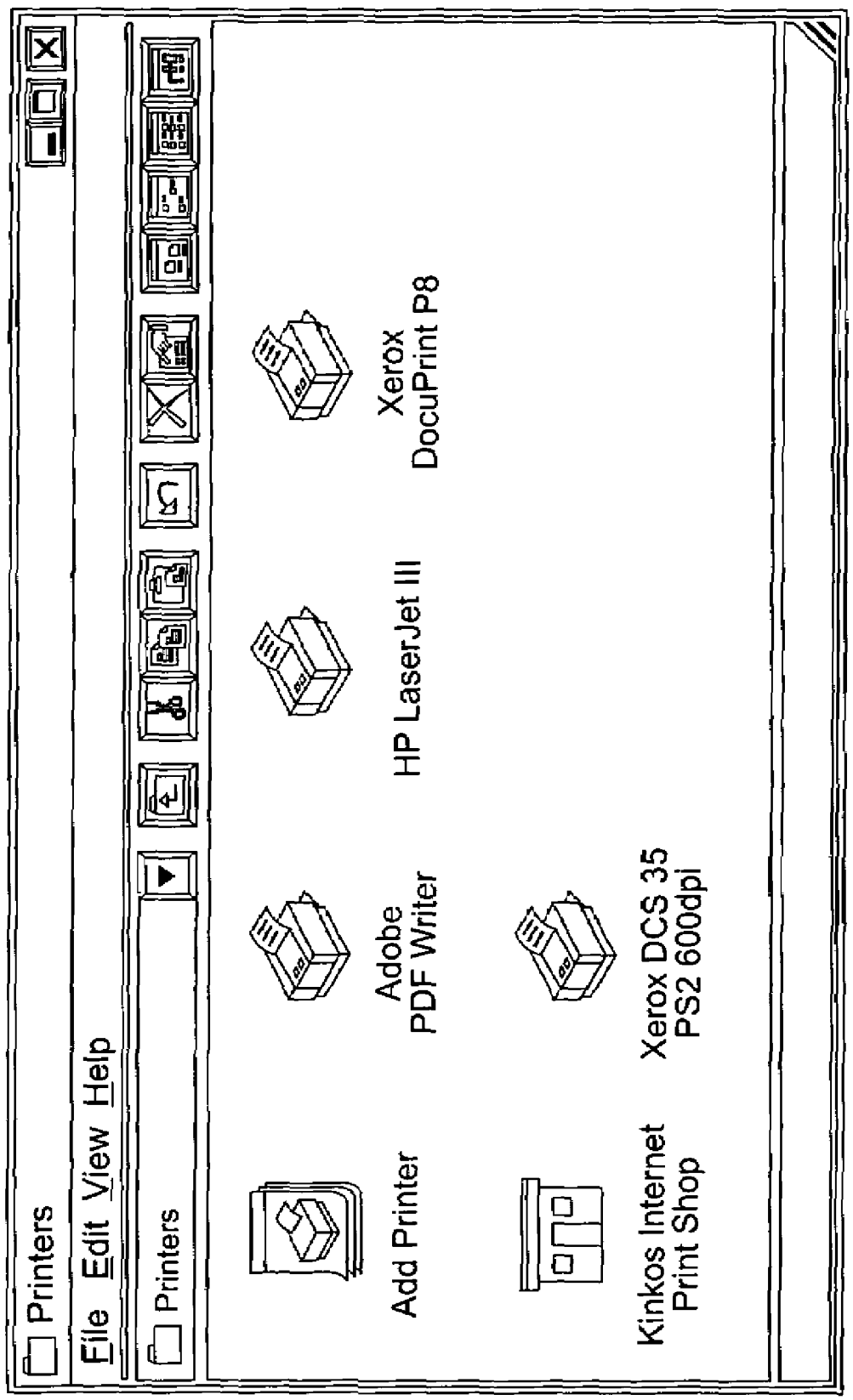
FIG. 3 is an exemplary Printers file displayed on a computer screen to assist in explaining an illustrative embodiment of the present invention.

In another embodiment, when a user opens the Printers folder in their operating platform such as NT™, or Windows 98™, the printers available for printing are displayed. The user may drag a document to be printed from their desktop or from one of their directories and drop the document onto the destination printer icon. Referring to FIG. 3, to route a document to a service bureau such as Kinko's, the user may drop the document onto the Internet Print Shop icon.

Upon selection of the Internet print destination by the user in the manner illustrated above or otherwise, the Internet browser program is activated to connect the computer to the server represented by the URL associated with the print destination. Thus, according to an illustrative embodiment, the Kinko's URL is activated and Kinko's Internet print web page is retrieved and displayed on the computer display. The Internet print web page may route the user to other pages within Kinko's web site and/or the page may request the user to fill out an order form. Filling out an order form may entail selecting from a series of various print job options and entering or confirming customer (i.e., user) information in occupied or blank fields on the form. Options may include typical service bureau printing type options including stapled or unstapled, single or double sided, paper type and size, number of copies and copy types, and typical service oriented options time required, rush or regular service, number of copies, copy types, delivery or pick up, and a special instruction box for unique or hard to explain options. Customer information may include, name, company, reference number, form of payment (credit card or company or individual account).

As noted, additional information may also be accessed by the user by pointing and clicking on hypertext links identified on the page retrieved from the service bureau's web site and navigating through the HTML (hypertext markup language format) formatted pages of the service bureau's site. HTML is a format that is widely used to present information at Internet web sites. Such other information provided by the service bureau can include pricing information and service bureau location information. The user may access service bureau location information to decide, for example, which branch of a service bureau to route the print job. A service bureau location page may access location information in a number of ways including by requesting the user to enter one or more of the following pieces of information pertinent to the desired location: zip code, area code, city and state, etc. In response, the service bureau may then provide a page with a list of service bureau locations satisfying the user's location criteria.

Once all necessary information has been provided, the user may submit the print job by select a submit print job icon, box or the like on the service bureau's web page. When this is done, the electronic document stored in the memory of the computer can be transferred to the service bureau server. After receiving the document for printing, the service bureau may automatically generate an electronic receipt for the print job, which may be sent immediately to the user's computer display, or alternatively may be an e-mail forwarded to the user's e-mail address.

The electronic document may be a text document, an image, a graphical document, a design or engineering document and other traditional documents. According to one embodiment, the electronic document may contain multimedia data. In the case of a multimedia document, the service bureau may be asked to generate copies of DVDs (digital video disk), CD (compact disc) ROMs (read-only memories) or other storage medium for multimedia information.

Once the user has used the service bureau for a print job, much of the initial information may be stored as a "cookie" in the user's computer. The next time the user routes a print job to the service bureau, "cookie" information may be retrieved when the user requests the service bureau to display certain pages, for example the customer information page, with the customer information and preferences already identified. If desired, the user may modify any information as necessary. Thus, information stored as "cookies" may include service bureau location, customer name and address, customer account number.

According to another embodiment of the invention, when the user selects to route a print job to a service bureau, rather than connecting the user directly to the service bureau, the user may be connected to an intermediary, such as Xerox. In this embodiment, the Internet browser program is activated to connect the computer to the server represented by the URL associated with the intermediary. Thus, according to an illustrative embodiment, the intermediary's URL is activated and an appropriate Internet print web page from the web site of the intermediary is retrieved and displayed on the computer display. The intermediary web page may route the user to other pages at their web site or to a service bureau's site and/or request the user to select from a series of various service bureau locations.

Several advantages can exist by using the intermediary. For example, the intermediary may allow the user to select from more than one service bureau vendor (e.g., Kinko's and Ikon). Also, specialized service bureau vendors can be provided such as a vendor with facilities for generating DVDs and CD ROMs.

Most, if not all, the functionality of the order form described with respect to the direct link of the user to the service bureau, without an intermediary, may instead be carried out with an order form at the intermediary's web site. For example, print job options, entry or confirmation of customer information, service bureau location information and the like may be performed by the intermediary site. Further, additional HTML formatted pages from the intermediary's site with information such as pricing information may be provided. Alternatively, the intermediary may provide an order form page which collects customer information and upon submission of the order form provides a hyperlink to the service bureau's site with a form requesting additional information, such as customer account information or credit card information. Further, upon selection of the service bureau by the user, the intermediary can route the user to the Internet print web page of the selected service bureau and control can proceed as described above when no intermediary web page is accessed.

In another embodiment, the user may access the intermediary or the service bureau's Internet print web page during a normal Internet connection through the browser program. During this connection to the Internet print web page, the user may fill out an order form to be saved in the user memory, for example as a cookie and accessed when the user chooses to route a print job to a service bureau. This permits the user to complete submission of the print job faster without having to fill out the forms in real time.

Figure 4:
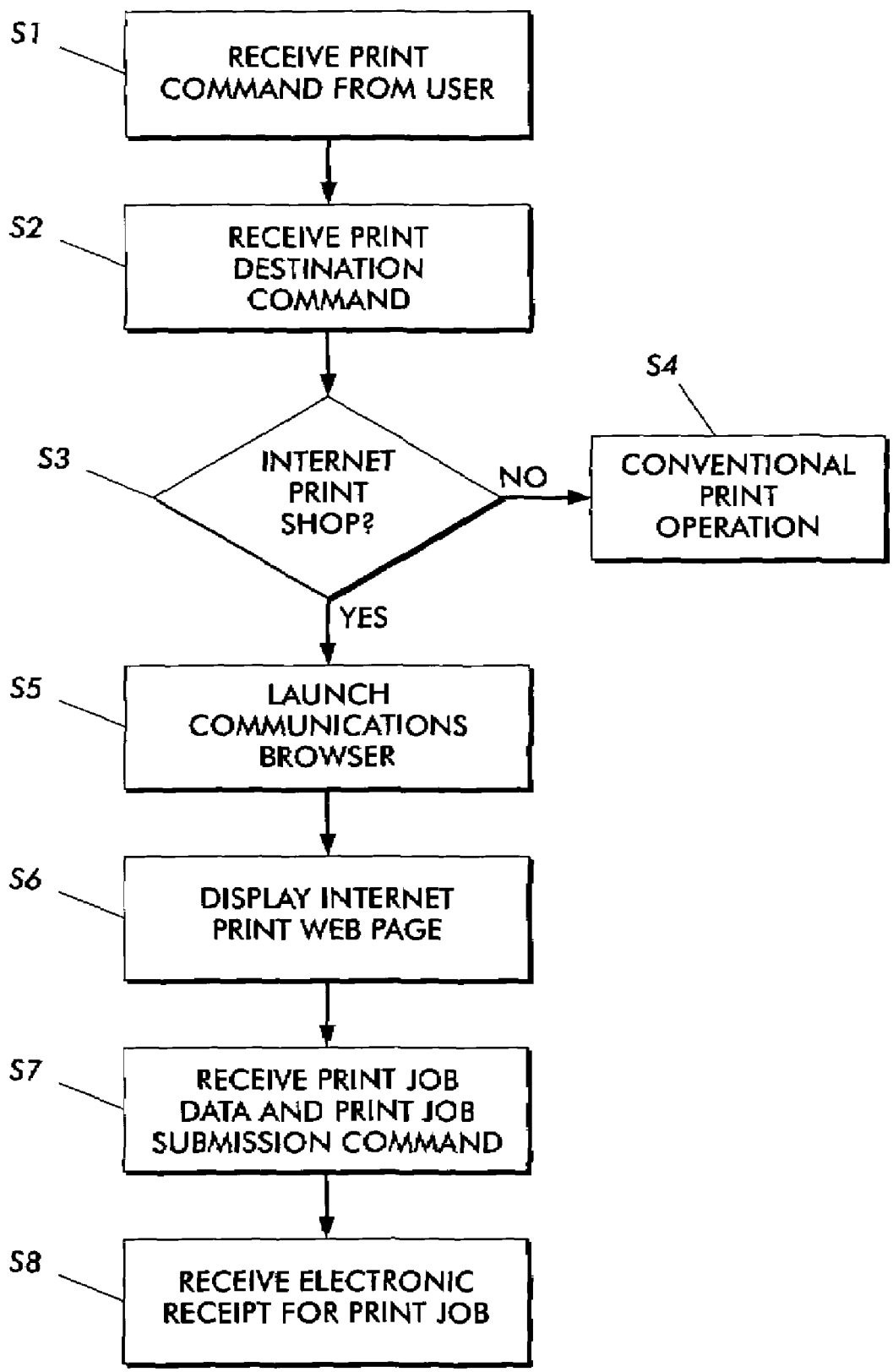
FIG. 4 is a flow chart showing an illustrative Internet print submission process according to the present invention.

A flow diagram of the main steps in one of the illustrative embodiments described above is shown in FIG. 4. In step S1, the computer 10 receives a user input command indicating the user desires to print a document. Next, in step S2 the user selects a print job destination such as a networked printer or the Internet Print Shop (i.e., a service bureau) for the destination of the print job. Steps S1 and S2 may be performed simultaneously. At step S3, the computer 10 determines which printer the user has selected. If the user has selected a networked printer, control passes to step S4 to carry out the known network printing. However, if the user selects the Internet Print Shop, control passes to step S5, to launch an embedded or external communications browser program to access one of the service bureau server 60 or the intermediary server 40 by a predefined address. For example, the address might be in the form of: "www.servicebureau.com/print".

At step S6, a service bureau server 60 or intermediary server 40 transmits an Internet print web page to the user, which is stored temporarily in the memory of the computer 10 and displayed to the user. In step S7, the computer 10 receives necessary information input into an order form for the print job filled out by the user, and responsive to a print job submission command, sends the order form and the electronic document to be printed through the Internet 30 to the service bureau server 60. The print job may be submitted either directly to the service bureau server 60 or through the Internet 30 by way of the intermediary server 40. The service bureau server, responsive to receipt of a print job, transmits an electronic receipt to the user's computer 10 by e-mail or otherwise in step S8.

While particular embodiments of the present invention have been described and illustrated, it should be understood that the invention is not limited thereto since modifications may be made by persons skilled in the art. The present application contemplates any and all modifications that fall within the spirit and scope of the underlying invention disclosed and claimed herein.

What is claimed is:

1. A method for submitting a document in electronic form from a computer to a service bureau for printing, comprising:
   displaying on the computer plural printer routing options, one of the printer routing options being a service bureau for printing;
   receiving a print command input to the computer for printing at the service bureau a document stored in memory accessible to the computer wherein the print command includes user individualized instructions;
   responsive to the print command, routing the document over Internet from the computer to at least one of the service bureau and an intermediary for printing, comprising
   automatically activating a communications program in the computer upon selection of the print command, and
   transmitting the document from the computer to a server associated with the service bureau or the intermediary;
   storing user selected individualized instructions in the memory accessible by the computer; and
   providing the stored user selected individualized instructions upon a subsequent selection of one of the displayed printer routing options.

2. The method of claim 1, wherein receiving the print command further comprising:
   retrieving a print web page from the server, the print web page including information identifying plural print job options;
   displaying the print web page on the computer, the web page including a print job order form; and
   responsive to a user selection of one or more print job options identified on the print job order form, transmitting the print job order form to the service bureau.

3. The method of claim 2, wherein the server is an intermediary server, and transmitting the print job order form includes transmitting the print job order form by way of the server to a server of the service bureau.

4. The method of claim 2, wherein the print job options include service bureau location.

5. The method of claim 1, wherein said receiving the print command includes receiving the print command from within an active application operating on the document.

6. The method of claim 5, wherein the active application can be any one of a word processing program, a database program, a graphics program, or a multimedia program.

7. The method of claim 1, wherein another of the printer routing options is a direct-networked printer.

8. The method of claim 1, further comprising receiving an acknowledgment that the document has been submitted to the service bureau for printing.

9. The method of claim 1, wherein the document includes multimedia content.

10. The method of claim 1, wherein the printer destinations are selected from at least one of an Internet print shop printer, local network printers and direct network printers.

11. The method of claim 1, wherein the user selected individualized instructions are stored as a cookie in the memory of the computer.

12. A computing machine, comprising:
   a computer controlled by software modules;
   a first module to sense an Internet print request, the first module displaying plural printer routing options, one of the printer routing options being the Internet print request;
   a second module to automatically launch a communications module upon a selection of the Internet print request to access a server associated with at least one of a service bureau and an intermediary at a predefined address, the server providing a browser with a print order form;
   a third module to display the print order form;
   a fourth module to transmit user individualized print order data and a document to be routed form the computer to the server providing the browser with the print order form, wherein the computer controlled by the modules selects the appropriate printer destinations; and
   a fifth module to store user selected individualized print order data in a memory accessible by the computer and to provide the user selected individualized print order data upon a subsequent selection of one of the printer routing options.

13. The machine of claim 12, wherein the document to be printed includes multimedia content.

14. The machine of claim 12, wherein said first module is for sensing print requests for direct networked printers.

15. The machine of claim 12, further comprising an applications module which is active when during operation of said first and second modules.

16. The machine of claim 15, wherein the applications module can be any one of a word processing program, a database program, a graphics program, or a multimedia program.

17. The machine of claim 12, wherein the printer destination is selected from at least one of an Internet print shop printer, local network printers and direct network printers.

18. The machine of claim 12, wherein the user selected individualized print order data are stored as a cookie in the memory of the computer.

19. A computer readable medium to control a computer and having modules stored thereon, the modules comprising:
   a first module to sense an Internet print request, the first module displaying plural printer routing options, one of the printer routing options being the Internet print request;
   a second module to automatically launch a communications module upon selection of the Internet print request to access a server associated with at least one of a service bureau or an intermediary at a predefined address, the server providing a browser with a print order form;
   a third module to display the print order form;
   a fourth module to transmit user individualized print order data and a document to be routed from the computer to the server providing the browser with the print order form,
   wherein the computer controlled by the modules selects the appropriate printer destination; and
   a fifth module to store user selected individualized print order data in a memory accessible by the computer and to provide the user selected individualized print order data upon a subsequent selection of one of the printer routing options.

20. The computer readable medium of claim 19, wherein the document to be printed includes multimedia content.

21. The computer readable medium of claim 19, further comprising an applications module which is active when during operation of said first and second modules.

22. The computer readable medium of claim 21, wherein the applications module can be any one of a word processing program, a database program, a graphics program, or a multimedia program.

23. The computer readable medium of claim 19, wherein the printer destination is selected from at least one of an Internet print shop printer, local network printers and direct network printers.

24. The computer readable medium of claim 19, wherein the user selected individualized print order data are stored as a cookie in the memory of the computer.

25. A computer readable storage medium storing a set of program instructions executable on a data processing device and usable to submit a document in electronic form to a service bureau, the set of program instructions comprising:
   instructions for displaying plural printer routing options;
   instructions for inputting a selection of one of the plural printer routing options, one of the printer routing options being the Internet print request;
   instructions for receiving a print command input to the computer for printing at the service bureau a document stored in memory accessible to the computer wherein the print command includes user individualized instructions;
   instructions for routing the document from the computer over the Internet to at least one of the service bureau and an intermediary for printing in response to the print command comprising;
      instructions for automatically activating a communications program in the computer upon selection of the print command; and
      instructions for transmitting the document to a server associated with the service bureau or the intermediary;
   instructions for storing user selected individualized instructions in the memory accessible by the computer and providing the stored user selected individualized instructions upon a subsequent selection of one of the displayed printer routing options.

26. The storage medium of clam 25, wherein the set of program instructions further comprises instructions for operating the Internet print request while an application is active during operation.

27. The storage medium of claim 25, wherein the instructions for operating the Internet print request while an application is active comprises instructions defining at least one of a word processing program, a database program, a graphics program, or a multimedia program.

28. The storage medium of claim 25, wherein the set of program instructions further comprises instructions for selecting an appropriate printer driver that includes at least one of an Internet print shop printer, local network printer, and direct network printer.

29. The storage medium of claim 25, wherein the user selected individualized instructions are stored as a cookie in the memory of the computer.

* * * * *